(12) United States Patent
Pica et al.

(10) Patent No.: US 6,652,750 B1
(45) Date of Patent: Nov. 25, 2003

(54) EXTERNALLY MOUNTED BILGE WATER FILTER AND METHODS THEREFOR

(76) Inventors: Samuel Pica, 12 Bellevue Ave., Belleville, NJ (US) 07109; Gary Libertell, 332 Mantoloking Rd., Brick, NJ (US) 08723

( * ) Notice: Subject to any disclaimer, the term of this patent is extended or adjusted under 35 U.S.C. 154(b) by 0 days.

(21) Appl. No.: 09/680,181

(22) Filed: Oct. 5, 2000

(51) Int. Cl.⁷ .............................................. B01D 35/02
(52) U.S. Cl. ...................... 210/251; 210/264; 210/437; 210/446; 210/502.1; 210/503; 210/691; 210/908; 114/183 R
(58) Field of Search ................................ 210/690–694, 210/232, 264, 290, 283, 502.1, 503, 908, 437, 446, 456, 251; 114/183 R

(56) References Cited

U.S. PATENT DOCUMENTS

| | | | | |
|---|---|---|---|---|
| 3,847,821 A | * | 11/1974 | Krueger | 210/488 |
| 3,951,814 A | * | 4/1976 | Krueger | 210/488 |
| 4,031,839 A | | 6/1977 | Pedone | 114/270 |
| 4,032,453 A | | 6/1977 | Pedone | 210/266 |
| 5,084,168 A | | 1/1992 | Woog | 210/202 |
| 5,609,760 A | | 3/1997 | Leach | 210/416.1 |
| 5,767,060 A | * | 6/1998 | Hanrahan | 210/502.1 |
| 5,948,253 A | | 9/1999 | Hearn | 210/282 |
| 6,056,881 A | | 5/2000 | Miller et al. | 210/702 |

* cited by examiner

*Primary Examiner*—Robert J. Popovics
(74) *Attorney, Agent, or Firm*—Lerner, David, Littenberg, Krumholz & Mentlik, LLP

(57) ABSTRACT

A bilge water filter for filtering bilge water discharged being drained from the bilge of a vessel includes a casing having first and second ends and at least one sidewall extending between the first and second ends, an inlet extending through the first end of the casing, and an outlet extending through the second end of the casing. The bilge water filter also includes a filter media disposed in the casing, between the inlet and the outlet, the filter media being adapted to absorb contaminants present in the bilge water while allowing substantially contaminant-free bilge water to be discharged from the outlet of the bilge water filter. The bilge water filter is adapted to be externally mounted to the outer surface of the hull of a vessel (i.e., to the outer surface of the hull) for draining bilge water from the vessel, capturing contaminants inside the filter and discharging contaminant-free bilge water from the outlet of the filter.

15 Claims, 3 Drawing Sheets

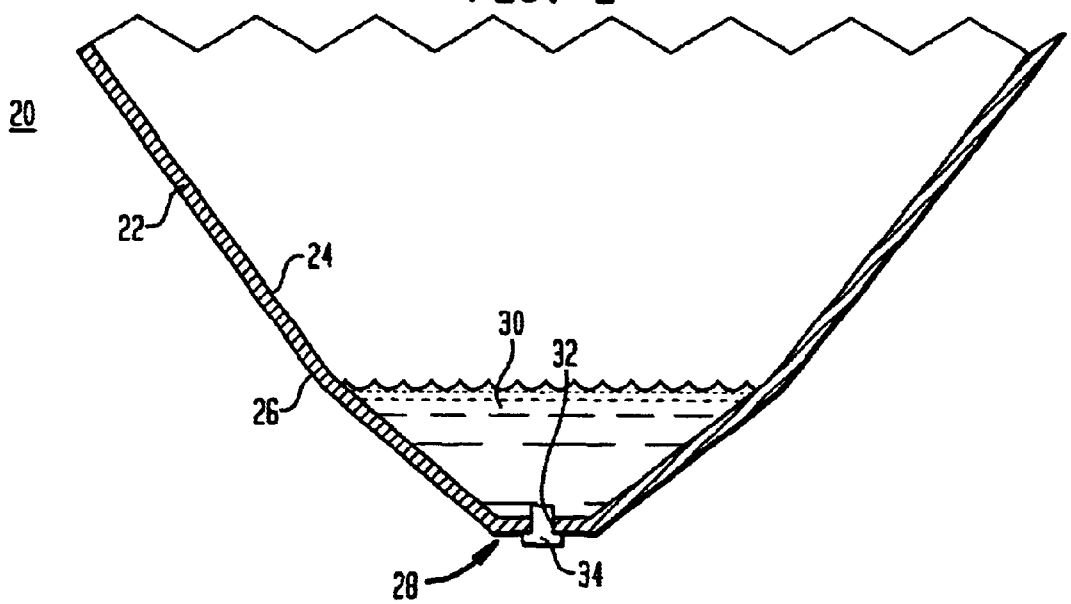
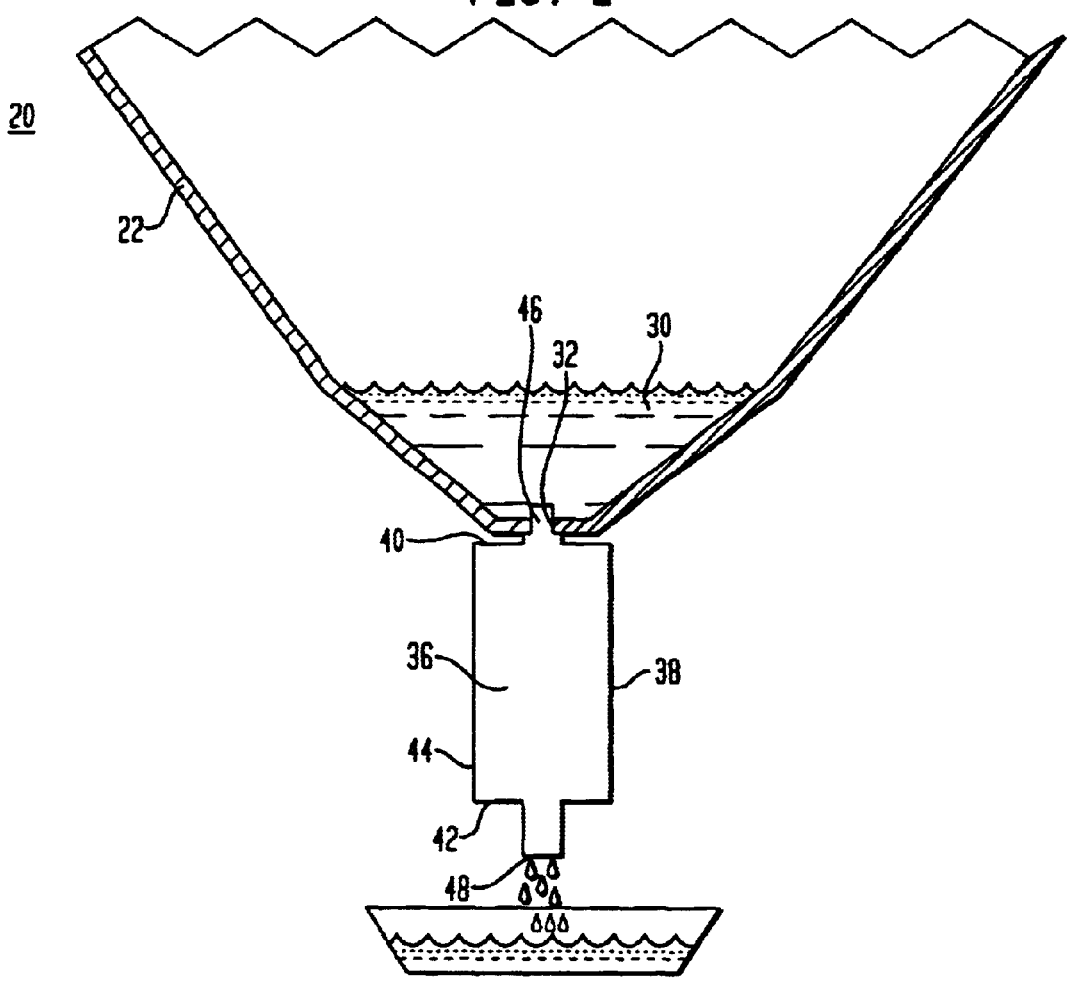

EXTERNALLY MOUNTED BILGE WATER FILTER AND METHODS THEREFOR

BACKGROUND OF THE INVENTION

1. Field of the Invention

The present invention is directed to filtering fluids and is particularly directed to removing contaminants from bilge water being discharged from a water-going vessel such as a boat or ship.

2. Description of the Prior Art

In recent years, federal, state and local governments have dramatically increased the amount of time spent solving environmental problems. Some of these environmental concerns involve the boating industry and efforts to maintain oceans, lakes, ponds, rivers and streams in a condition suitable for animals and humans alike. Recently, the United States government enacted the Federal Water Pollution Control Act, commonly referred to as the "Clean Water Act," which provides regulations for maintaining clean waters in the United States of America. Some of the regulations set forth in the Clean Water Act are directed to the discharge of contaminants, such as oil and other petroleum-based products, into the waters of the United States. As a result, boaters, boat dealers and boating service centers are now strictly regulated regarding the potential for discharging contaminates from boats into U.S. waters. One particular concern regards bilge water that must periodically be discharged from the hulls of boats. Such discharge may occur during operation of the boat or when the boat is removed from the water for storage or maintenance. As is well known to those skilled in the art, bilge water generally collects in the low point's of a boat's hull and is frequently contaminated by a wide variety of pollutants, including petroleum-based products, gasoline, oil, transmission and power steering fluids, cleaning solvents and paint.

There are presently many different systems used to remove bilge water from boats and to filter the bilge water before it is discharged overboard. For example, U.S. Pat. No. 4,031,839 to Pedone discloses reusable oil absorbent pads that may be placed in the hull of a boat. Each pad has an absorbent filler material which repels water and which attracts oil so that it will draw oil from the outside of the bag toward the inside of the bag.

U.S. Pat. No. 5,609,760 to Leach discloses an oil filtering system for bilge water including an oil filter having an elongated tubular housing and a discharge end wall having an outlet fitting adapted to be connected to an outlet conduit. The opposite end of the tubular housing has an access flange having a circular sealed recess within which is received a circular sealing gasket. The access flange is provided with connection apertures on opposite sides thereof. The filter includes a tubular filter support that is secured to the external surface area of a perforated filter support tube. An elongated filter media is positioned about the perforated filter support tube. The filter media is made of an oil absorbing material such as a polyolefin hydrocarbon. During operation, bilge pump forces bilge water through a central passage of the perforated filter support tube, through the perforations of the filter support tube and through the filter media. As a result, any oil or other particles in the bilge water is captured by the filter media.

U.S. Pat. No. 5,084,168 to Woog discloses a filtering assembly for removing hazardous particles from a fluid. The filtering assembly includes a cylindrical housing having an outlet spaced from the inlet. Adjacent the inlet, a metal precipitate chamber is provided having rolled fiberglass for capturing the hazardous particles.

U.S. Pat. No. 5,948,253 to Hearn discloses a three layer hydrocarbon filter for removing hydrocarbons and synthetic hydrocarbons (e.g. oil) from water by adsorption and/or absorption. The filter has at least three layers of filter media that extend outwardly relative to the longitudinal axis of the filter. The layers of filter media are placed within a casing. The first and third layers of filter media include a first material that is hydrophobic and which removes hydrocarbons from contaminated water through adsorption or absorption. The second layer of filter media includes a mixture of the first filter media material with a second material.

U.S. Pat. No. 6,056,881 to Miller et al. discloses a bilge water filtration system for removing petroleum-based liquid contaminates from bilge water as the bilge water is pumped from the bilge area of a boat to a discharge outlet in the hull of the boat. The system uses filtration media enclosed in a modular unit equipped with a filter tube so that the filter media can be easily installed in the system and removed to allow for destruction or recycling of the contaminants trapped by the filter media. The bilge water filtration system is designed to be installed "in-line" with an existing bilge pumping system on boats or yachts.

In spite of the above efforts, there remains a need for a simplified and cost-effective method for removing contaminated bilge water from boats and ships.

SUMMARY OF THE INVENTION

In accordance with certain preferred embodiments of the present invention, a bilge water filter externally mountable to a bilge water discharge outlet of a vessel, such as a boat or a ship, includes a casing having a first end, a second end remote therefrom and at least one sidewall extending between the first and second ends. The bilge water filter also preferably includes an inlet extending through the first end of the casing and an outlet extending through the second end of the casing. The filter has a hydrophobic filter media disposed in the casing between the inlet and the outlet, the filter media being adapted to absorb contaminants present in the bilge water while allowing substantially contaminant-free bilge water to be discharged from the outlet. The inlet of the bilge water filter is desirably adapted to be externally mountable to the bilge water discharge outlet of the vessel for draining bilge water from the vessel. In certain preferred embodiments, the inlet of the bilge water filter includes an inlet tube that is connected to the first end of the casing. The inlet tube may have external threads formed thereon so that the inlet tube may be screwed into the bilge water discharge outlet of the vessel. In other preferred embodiments, the inlet tube may have an outer radial surface engagable with the bilge water discharge outlet of the vessel. In this latter embodiment, the inlet tube may be snap-fit or friction-fit into the bilge water discharge outlet of the vessel.

The hydrophobic filter media preferably absorbs contaminants present in the bilge water, including but not limited to petroleum-based products, oil, gasoline, transmission fluid, power steering fluid, cleaning solvents and paint. The hydrophobic media, which may include a fibrous material, absorbs the contaminates in the bilge water while allowing the contaminant-free portion of the bilge water to pass therethrough. The bilge water filter may also include a coarse material, such as gravel or charcoal, disposed in the casing between the hydrophobic filter media. The coarse material is adapted to control the flow rate of the bilge water passing through the filter casing. In certain preferred embodiments, the coarse material forms a continuous, circuitous path between the inlet and the outlet of the casing. The path of the coarse material may include a series of legs extending between the first and second ends of the casing, whereby the filter media is disposed between the legs of the coarse material. The casing may have a longitudinal axis extending between the inlet and the outlet of the filter, whereby the casing has at least one sidewall that is substantially cylindrical. The casing may be made of a durable material such as stainless steel or plastic.

In other preferred embodiments, the inlet tube is substantially hollow, has a first axial opening outside the casing, a second axial opening inside the casing, a sidewall extending between the first and second axial openings and a plurality of peripheral openings extending through the sidewall of the inlet tube. As a result, bilge water entering the inlet tube may pass into the casing through the peripheral openings in the sidewall of the inlet tube and also through an opening at the second end of the tube (located inside the casing). The filter media may also include a substantially cylindrical-shape pad disposed inside the casing and extending at least partially around the portion of the inlet tube disposed in the casing. In other referred embodiments, the filter media may include a filter media pad disposed between the inlet tube and the outlet tube of the bilge water filter. The filter media pad between inlet and outlet tubes may be in substantial alignment with the inlet and outlet tubes to provide a further means for removing contaminants from the bilge water.

Although the present invention is not limited by any particular theory of operation, it is believed that providing a bilge water filter that may be externally attached to the outer surface of a hull will greatly facilitate the process of draining bilge water from the bilge of a boat or ship. This is because it is much simpler to drain bilge water from the outside of the boat as opposed to using draining apparatus inside the relatively cramped bilge area of a boat. Another benefit of the present invention is that boat operators will be much more likely to filter the bilge water that they drain from their boats, thereby minimizing the likelihood that boat operators will drain contaminated bilge water directly onto the ground in violation of the above-mentioned Clean Water Act.

In another preferred embodiment of the present invention, a method for draining bilge water from a bilge water discharge outlet of a vessel includes providing a bilge water filter having an inlet and an outlet, the bilge water filter having a filter media adapted to absorb contaminants present in the bilge water while allowing substantially contaminant-free bilge water to be discharged from the outlet of the bilge water filter. The method also includes opening the bilge water discharge outlet from the vessel, such as by removing a plug closing the bilge water discharge outlet, and externally mounting the bilge water filter to the outer surface of a hull of the vessel so that the inlet of the bilge water filter is in substantial alignment with the discharge outlet of the vessel. The inlet is preferably inserted into the bilge water discharge outlet to commence draining the bilge water from the hull. The method also preferably includes draining the bilge water through the discharge outlet of the vessel and through the bilge water filter, the bilge water filter capturing the contaminants in the bilge water while allowing the contaminant-free portion of the bilge water to be discharged through the outlet of the bilge water filter. In preferred embodiments, the step of securing the inlet of the bilge water filter to the discharge outlet of the vessel may include screwing the inlet tube into the bilge water discharge outlet, or snap-fitting the inlet tube in the bilge water discharge outlet.

These and other preferred embodiments of the present invention will be described in more detail below.

BRIEF DESCRIPTION OF THE DRAWINGS

FIG. 1 shows a cross-sectional view of a hull of a boat having bilge water collected in the hull.

FIG. 2 shows a bilge water filter used to drain bilge water collected in the hull shown in FIG. 1, in accordance with certain preferred embodiments of the present invention.

DETAILED DESCRIPTION OF PREFERRED EMBODIMENTS

Figure 3:
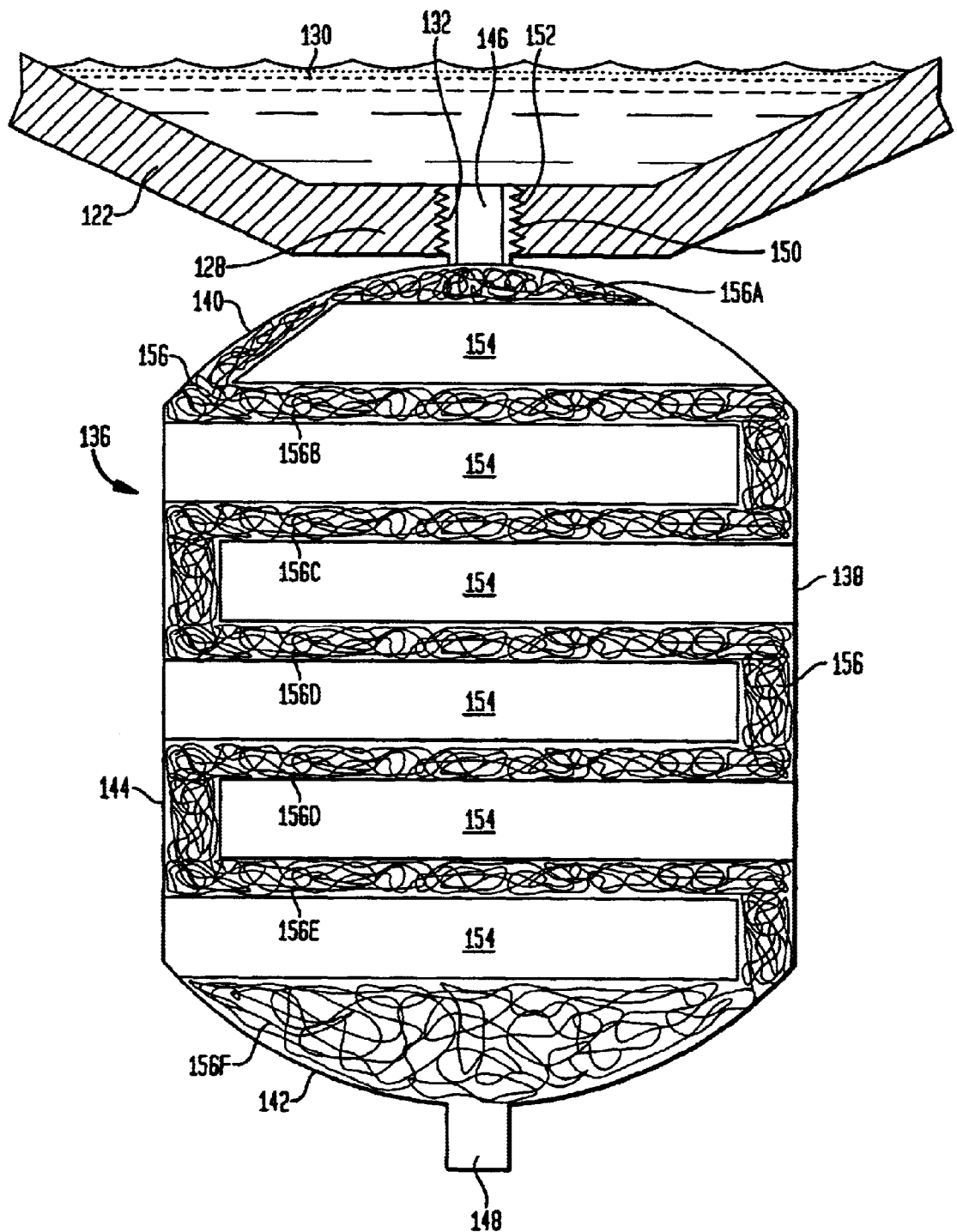
FIG. 3 shows a cross-sectional view of a bilge water filter, in accordance with certain preferred embodiments of the present invention.

FIG. 1 shows a boat 20 including a hull 22 having an interior surface 24 and an exterior surface 26. The hull 22 includes a low point 28, commonly referred to as the bilge, in which bilge water 30 frequently collects. This bilge water must be periodically removed from the hull to avoid problems such as dampness and warping of the hull. In order to remove the bilge water 30, the hull 22 is provided with a bilge water discharge outlet 32. The outlet 32 is normally closed by a plug 34 that may be removed when an operator desires to drain the bilge water 30 from the hull 22.

In certain preferred embodiments, in order to drain bilge water 30 from the lower portion 28 of hull 22, boat 20 is removed from water and placed on land. This is commonly called dry-docking a boat. Plug 34 may than be removed for discharging bilge water through bilge water discharge outlet 32.

Referring to FIG. 2, in accordance with one preferred embodiment of the present invention, after bilge plug 34 is removed, a bilge water filter 36 may be externally secured to hull 22 and in bilge water discharge outlet 32. Bilge water filter 36 preferably includes a filter casing 38 having a first end 40, a second end 42 and at least one sidewall 44 extending between the first and second ends 40, 42. Bilge filter 36 includes an inlet 46 extending through first end 40 of casing 38 and an outlet 48 extending through second end 42 of casing 38. Bilge water filter 36 also desirably includes a filter media (not shown) disposed in casing 38 between inlet 46 and outlet 48. As will be described in more detail below, the filter media is adapted to absorb any contaminates present in contaminated bilge water 30, such as oil and gasoline, while allowing substantially contaminant-free bilge water to be discharged from outlet 48. Unlike prior art bilge water filtering systems wherein the filter is positioned "in-line" between a bilge pump and the bilge water discharge outlet in the hull, the present invention provides a more simplified and cost-effective design whereby the bilge water filter may be externally attached to boat 20 from outside hull 22. In other words, the bilge water filter of the present invention is attached to the boat from the outside of the hull 22, preferably after the boat has been removed from the water for storage or maintenance. Thus, the present invention greatly facilitates the process of draining bilge water 30 from hull 22 of a boat, particularly for the small-time boat operator. Moreover, the externally mounted bilge water filter of the present invention greatly simplifies the process for draining bilge water from a boat, thereby improving the chance that boaters will fully comply with all the provisions of the Clean Water Act.

Referring to FIG. 3, in accordance with certain preferred embodiments of the present invention, a bilge water filter 136 for draining bilge water 130 from a hull 122 of a vessel includes casing 138 having first end 140, second end 142 remote from first end 140 and cylindrical sidewall 144 extending between first end 140, and substantially second end 142. Bilge water filter 136 includes inlet 146 extending through the first end 140 of casing 138 and outlet 148 extending through the second end 142 of casing 138. In one preferred embodiment, inlet 146 is defined by neck 150 attached to the first end 140 of casing 138. Neck 150 preferably has external threads 152 adapted for screwing neck 150 into bilge water discharge outlet 132 of hull 122. As a result, bilge filter 136 may be easily mounted to the external surface of hull 122 for draining bilge water 130.

Bilge water filter 136 includes filter media 154 disposed inside casing 138 between inlet 146 and outlet 148. Filter media 154 is preferably adapted to absorb any contaminates present in the bilge water 130, including but not limited to petroleum-based products, gasoline, oil, transmission and steering fluid, paints and cleaning solutions. In certain preferred embodiments, filter media 154 is a fibrous material. Bilge water filter 136 also includes a coarse material 156, such as gravel or charcoal that allows the contaminant-free portion of the bilge water 130 to pass therethrough. The coarse material 156 preferably controls the flow rate of the bilge water through the filter 136.

In the particular preferred embodiment shown in FIG. 3, filter media 154 includes a series of filter media pads that are spaced apart from one another. The filter media pads preferably extend in directions transverse to the longitudinal axis of casing 138. The coarse material 156 is preferably packed around the filter media 154 to form a continuous, circuitous path between the inlet 146 and the outlet 148 of casing. In other words, coarse material 156 includes legs 156A–156F extending between filter media pads 154.

In operation, a plug (not shown) covering bilge water discharge outlet 132 is removed so that bilge water 130 may flow through the outlet 132. Simultaneously, the externally threaded neck 150 connected to first end 140 of filter is screwed into discharge outlet 132. After the bilge water 130 flows into the inlet, bilge water 130 passes through the legs 156A–156F of the coarse material 156. As the bilge water passes by the filter media pads, filter media 154 absorbs the petroleum-based products or other contaminates present in the bilge water. However, because filter media 154 is hydrophobic, it does not absorb contaminant-free portion of the bilge water, but allows this substantially pure water to pass therethrough without being absorbed. As a result, the bilge water 130 may be drained from hull 122 with the contaminants in bilge water 130 being absorbed by filter media 154 and the contaminant-free bilge water being discharged from outlet 148.

Figure 4:
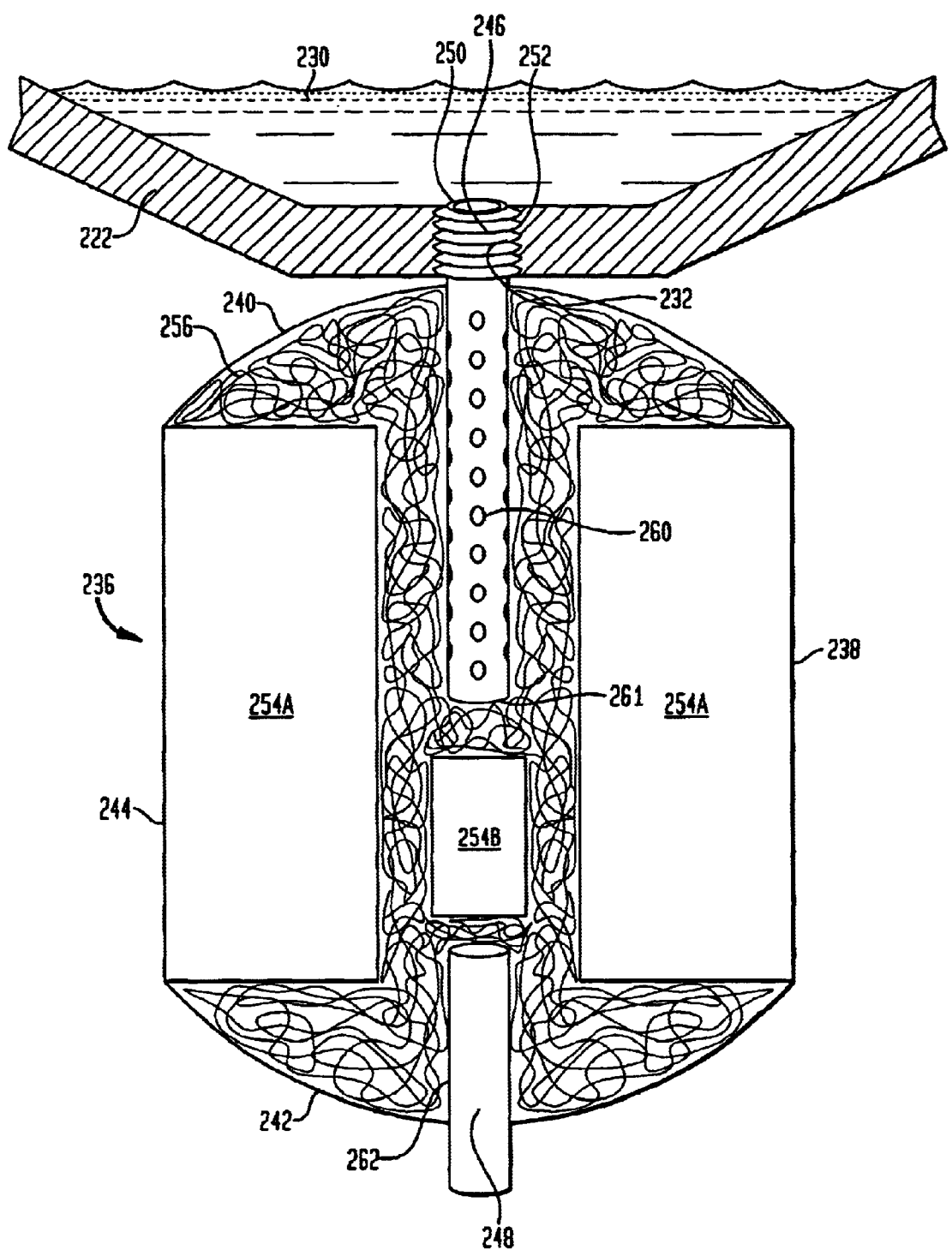
FIG. 4 shows a cross-sectional view of a bilge water filter, in accordance with further preferred embodiments of the present invention.

Referring to FIG. 4, in accordance with another preferred embodiment of the present invention, a bilge water filter 236 includes a filter casing 238 having first end 240 and second end 242 remote therefrom. Filter casing 238 includes a substantially cylindrical sidewall 244 extending between first and second ends 240, 242. Bilge water filter 236 has an inlet 246 extending through first end 240 of casing 238 and an outlet 248 extending through second end 242 of casing 238. The inlet 246 preferably comprises a hollow tube 250 integrally connected to first end 240. Hollow tube 250 preferably includes external threads 252 so that bilge water 236 may be screwed into discharge outlet 232 in hull 222. Hollow tube 250 desirably includes a plurality of peripheral openings 260 extending therethrough and opening 261 at the second end of tube 250.

Bilge water filter 236 also desirably includes a filter media 254 disposed inside casing 238. In the particular preferred embodiment shown in FIG. 4, filter media includes first filter media pad 254A that substantially surrounds inlet tube 250 and second filter media pad 254B that is in substantial axial alignment between inlet tube 250 and outlet tube 262. Bilge water filter 236 also includes coarse material 256, such as gravel or charcoal, packed inside casing 238. Coarse material 256 preferably occupies the area within casing 238 that is not occupied by filter media 254. As described above, coarse material 256 controls the flow of bilge water 230 between inlet 246 and outlet 248.

In operation, inlet tube 250 is screwed into discharge outlet 232 of hull 222. Bilge water 230 flows into inlet tube 250 and passes through peripheral openings 260 and opening 261 at second end of tube 250. Bilge water 230 then flows through coarse media 256 until it contacts filter media 254. Filter media 254 is hydrophobic, allowing the contaminant-free portion of bilge water to pass therethrough while absorbing the contaminants present in the bilge water 230, such as oil, gas or other petroleum-based products. Filter media pad 254B is desirably placed between inlet tube 250 and outlet tube 262 to provide an additional means for removing contaminants from bilge water 230 as the bilge water passes between inlet 246 and outlet 248. After passing through casing 238, contaminant-free bilge water is discharged through outlet 248, with the contaminants in bilge water 230 being absorbed by filter media 254.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system including a water-going vessel having a hull and a bilge water filter externally mountable to a bilge water discharge outlet of said water-going vessel comprising:
   a casing having a first end, a second end and at least one sidewall extending between the first and second ends;
   an inlet extending through the first end of said casing;
   an outlet extending through the second end of said casing; and
   a hydrophobic filter media disposed in said casing between the inlet and the outlet, said filter media being adapted to absorb contaminants present in said bilge water while allowing substantially contaminant-free bilge water to be discharged from said outlet, wherein the inlet of said bilge water filter is externally mounted outside the hull of said water-going vessel to the bilge water discharge outlet of said water-going vessel for draining bilge water from said water-going vessel.

2. The system as claimed in claim 1, wherein the inlet of said bilge water filter includes an inlet tube connected to the first end of said casing, said inlet tube having external threads threadable into the bilge water discharge outlet of said vessel.

3. The system as claimed in claim 1, wherein the inlet of said bilge water filter includes an inlet tube having an outer radial surface engagable with the bilge water discharge outlet of said vessel for securing said bilge water filter to said vessel.

4. The system as claimed in claim 1, wherein said hydrophobic filter media absorbs contaminants present in said bilge water and allows contaminant-free bilge water to pass therethrough.

5. The system as claimed in claim 4, wherein said hydrophobic filter media includes a fibrous material.

6. The system as claimed is claim 4, further comprising a coarse material disposed in said casing and between said hydrophobic filter media, wherein said coarse material is adapted to control the flow rate of said bilge water through said filter casing.

7. The system as claimed in claim 6, wherein said coarse material is selected from the group consisting of charcoal and gravel.

8. The system as claimed in claim 1, wherein said contaminants are selected from the group consisting of petroleum-based products, oil, gasoline, transmission fluid, power steering fluid, cleaning solvents and paint.

9. The system as claimed in claim 1, wherein said casing has a longitudinal axis extending between the inlet and the outlet thereof, and said at least one sidewall is a substantially cylindrical side wall.

10. The system as claimed in claim 1, wherein said casing is made of a material selected from the group consisting of stainless steel and plastic.

11. The system as claimed in claim 1, wherein said bilge filter includes an inlet tube passing through the inlet of said casing, said inlet tube being connected to the first end of said casing.

12. The system as claimed in claim 11, wherein said inlet tube is substantially hollow, has a first axial opening outside said casing, a second axial opening inside said casing, a sidewall extending between the first and second axial openings and a plurality of peripheral openings extending through the sidewall.

13. The system as claimed in claim 11, wherein said filter media includes a first substantially cylindrical-shaped pad extending at least partially around a portion of the inlet tube disposed in said casing.

14. The system as claimed in claim 13, wherein said filter media further comprises a second filter media disposed between said inlet tube and said outlet tube.

15. The system as claimed in claim 14, wherein the second filter media pad of said is in substantial alignment with the inlet tube and the outlet tube of said bilge filter.

* * * * *

UNITED STATES PATENT AND TRADEMARK OFFICE
CERTIFICATE OF CORRECTION

PATENT NO. : 6,652,750 B1
DATED : November 25, 2003
INVENTOR(S) : Samuel H. Pica, Jr., Ralph M. Papke and Gary Libertell It is certified that error appears in the above-identified patent and that said Letters Patent is hereby corrected as shown below:

Column 1,
Line 34, "point's" should read -- points --.
Line 58, after "operation," insert -- a --.

Column 30,
Line 20, "shape" should read -- shaped --.
Line 23, "referred" should read -- preferred --.

Column 5,
Line 33, after "casing" insert -- 138 --.
Line 39, after "filter" insert -- media 154 --.
Line 46, after "absorb" insert -- the --
Line 63, after "water" insert -- filter --.

Column 6,
Line 3, after "media" insert -- 254 --.

Column 7,
Line 5, "is" should read -- in --.

Column 8,
Line 20, after "said" insert -- system --.

Signed and Sealed this

Fourth Day of May, 2004

JON W. DUDAS
*Acting Director of the United States Patent and Trademark Office*

UNITED STATES PATENT AND TRADEMARK OFFICE
CERTIFICATE OF CORRECTION

| | |
|---|---|
| PATENT NO. | : 6,652,750 B1 |
| DATED | : November 25, 2003 |
| INVENTOR(S) | : Samuel H. Pica, Jr., Ralph M. Papke and Gary Libertell |

It is certified that error appears in the above-identified patent and that said Letters Patent is hereby corrected as shown below:

Column 30 should read -- Column 3 --.

Signed and Sealed this

Twenty-seventh Day of July, 2004

JON W. DUDAS
*Acting Director of the United States Patent and Trademark Office*